United States Patent [19]

Prill

[11] 4,270,120
[45] May 26, 1981

[54] SOLID STATE SYNCHRO TORQUE RECEIVER DRIVER

[75] Inventor: Robert S. Prill, Parsippany, N.J.

[73] Assignee: The Singer Company, Little Falls, N.J.

[21] Appl. No.: 58,696

[22] Filed: Jul. 18, 1979

[51] Int. Cl.³ .......................................... H03K 13/02
[52] U.S. Cl. ............................. 340/347 SY; 318/656; 340/347 DA; 340/347 M
[58] Field of Search .... 340/347 M, 347 SY, 347 DA; 318/661, 654–660

[56] References Cited

U.S. PATENT DOCUMENTS

| | | | |
|---|---|---|---|
| 3,739,197 | 6/1973 | Prill et al. | 330/252 X |
| 3,832,707 | 8/1974 | Buchanan et al. | 340/347 DA |
| 3,993,993 | 11/1976 | Griffin | 340/347 DA X |

OTHER PUBLICATIONS

The Engineering Staff of Analog Devices, Inc., Analog–Digital Conversion Handbook, 6/1972, pp. III-1 to III-8.

Primary Examiner—Thomas J. Sloyan
Attorney, Agent, or Firm—Laurence A. Wright; Thomas W. Kennedy

[57] ABSTRACT

A solid state synchro torque receiver driver that uses unfiltered AC as the power source and push-pull regulating transistors operating in the linear mode to drive the torque receiver stator loads. A feedback amplifier compares the push-pull outputted AC signal against an inputted AC data reference (i.e. the desired stator excitation amplitude) and thus closes the loop forcing the output to follow the input. The synchro torque receiver operates in a closed loop and thus has realizable potential of near infinite resolution and high accuracy.

3 Claims, 3 Drawing Figures

SOLID STATE SYNCHRO TORQUE RECEIVER DRIVER

PRIOR ART

| U.S. Pat. No. | Inventor | Issue Date |
|---|---|---|
| 3,419,774 | Hartley | 12/68 |
| 3,562,740 | Watkins | 2/71 |

This invention is related to solid state synchro drivers. More particularly, this invention is related to a solid state synchro torque receiver driver which derives its output capability from an AC supply as opposed to conventional techniques that require DC supplies.

BACKGROUND OF THE INVENTION

There have been many attempts to replace prior art electromechanical torque receiver drivers with modern solid state electronics. Most of the schemes are bulky, wasteful in power consumption, and not cost competitive with the electromechanical parts they try to replace.

In general there are basically two types of solid state synchro torque receiver drivers; open and closed loop types. Of the open loop types the tapped transformer method is considered to be the classic solid state approach. In this approach saturated transistors are used to switch ratiometric voltages from various transfer taps directly to the synchro torque receiver stators. This scheme works very well where low resolution and accuracy can be tolerated, e.g. 36° increments representing numeric wheel positions (0, 1, 2, ... 9). When higher resolutions are required the number of taps and the number of switching transistors become prohibitive. In addition, accuracy is seriously compromised.

Of the closed loop variety the classic method of driving the synchro stator loads is to generate ratiometric reference voltages representing the desired rotor position and via a feedback system force the outputs to follow the input references. In the classic approach cost and bulky high current, high voltage power supplies are used to power conventional feedback power supplies.

The present invention emulates an electromechanical synchro driver and belongs to the closed loop class. Its major novel advantage is that it draws its power directly from the raw AC.

BRIEF DESCRIPTION OF THE INVENTION

The solid state synchro torque receiver driver of the present invention comprises a transformer for providing raw AC voltage at 0° and 180° phases to a feedback amplifier, and a push-pull amplifier output circuit consisting of NPN and PNP transistors for driving the torque receiver driver stator loads. By means of the feedback amplifier a signal from the push-pull amplifier is compared with the input signal to the feedback amplifier. The feedback amplifier develops an error signal which forces the push-pull amplifier to follow the input.

In a second embodiment of the invention the complementary NPN and PNP transistors are replaced by complementary FETS affording higher current gain. In this embodiment the feedback amplifier drives the power field effect transistors (FET) which in turn drive the stators of the synchro. The output FET amplifiers develop an error signal and by means of the feedback amplifier the output signal is made to follow the input.

Accordingly, it is an object of this invention to provide a solid state torque receiver driver which derives its output capability from raw AC as opposed to conventional techniques that require DC supplies.

This and other objects, features and advantages of the present invention will become apparent from the following description taken in conjunction with the accompanying drawings wherein.

In synchro torque receiver applications the basic problem is to drive the synchro stator leads to predetermined AC voltages (ratiometric) representing the desired rotor position. If the position is $\theta$, then the resulting stator excitation is given by $A(\sin \theta + 60°)$ and $A(\sin \theta - 60°)$. This assumes that one stator lead is grounded, as is the case in most applications.

Realizing that these ratiometric reference amplitudes if impressed on the stator leads define the desired rotor position angle provided that they are in time synchronism (phased properly) with the rotor excitation, then the novel feature of the invention surfaces. In particular the AC output amplitudes to each stator can be synthesized from a constant amplitude prooperly phased AC power source using feedback and pass regulator techniques forcing the output to regulate and follow the corresponding AC reference.

The most significant features of this invention are: that the scheme is a feedback approach and therefore in principle can be made as accurate as the ratiometric references, it is unconditionally stable because of DC feedback and therefore can't hang up 180° out of phase as other schemes do, and bulky high voltage and high current DC power supplies are completely eliminated.

Figure 1:
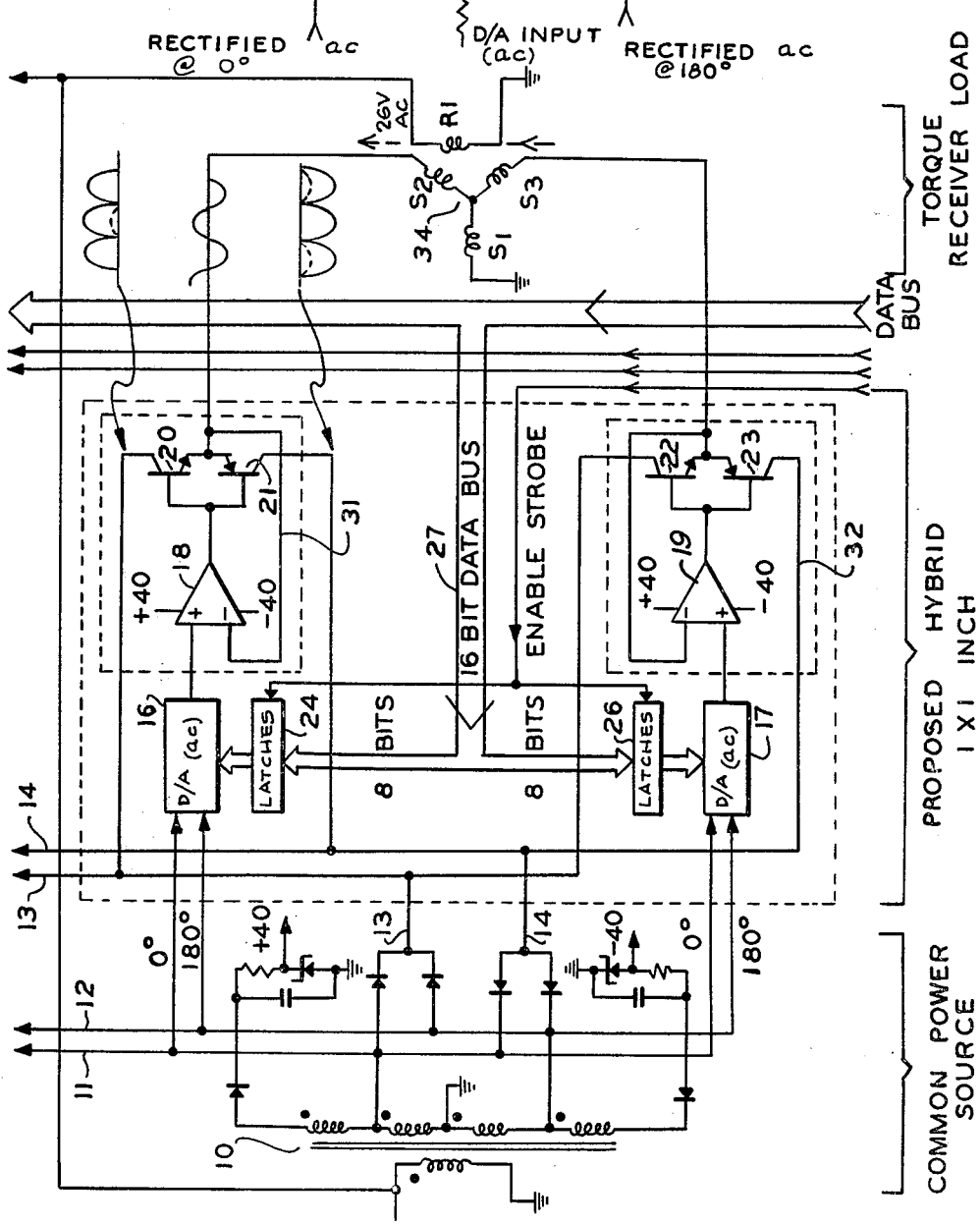
FIG. 1 is a functional diagram of the solid state synchro torque receiver driver of the invention.

In the detailed bipolar implementation of FIG. 1 full wave rectification of the power source is required. The center tapped transformer 10 and rectifying diodes, whose outputs appear on lines 13 and 14, provide properly phased rectified AC source to the power amplifier stage. Both positive and negative rectification is required. (In the FET implementation of FIG. 3 rectification is not required.) On lines 11 and 12 there is a 0° phase voltage and a 180° phase voltage respectively and on lines 13 and 14 there is rectified AC. The 0° and 180° phase voltages are applied to digital to analog blocks 16 and 17. Feedback amplifier 18 receives an input from block 16 and a feedback signal on line 31. The output of feedback amplifier 18 is applied to push-pull transistors 20 and 21. The collectors of push-pull transistors 20 and 21 are connected directly to the rectified AC on lines 13 and 14. The output of push-pull amplifiers 20 and 21 is applied to the stator windings $S_2$ of synchro 34. Stator winding $S_1$ is normally connected to ground with no loss of generality. Rotor $R_1$ is excited by the same AC phase that excites the transformer. As implemented the transformer and rotor phase shifts tend to cancel to a first order approximation. Digital to analog converter 17, feedback amplifier 19 and push-pull amplifiers 22 and 23 perform exactly as their previously mentioned corresponding circuits. A data bus 27, capable of a 16 bit data information transfer, supplies 8 bits each to latches 24 and 26. The purpose of latches 24 and 26 is to hold the digital data to the analog blocks 16 and 17 between up dates. It is understood that the components of the power amplifier of FIG. 1 may be manufactured on a single hybrid substrate.

In operation, referring to FIG. 1, the desired rotor position A(sin $\theta$+60°) and A(sin $\theta$−60°) is inputted to 4 quadrant multiplying type D/A converters 16 and 17. The most significant bit (MSB) of each D/A input controls the phase of the desired reference signal (0° or 180°) and the least significant bits (LSB's) control the amplitude. The result is that each D/A outputs the desired AC reference, defining, ratiometrically the desired synchro rotor position or angle. The feedback power amplifiers 18 and 19 compare, at the stator, the D/A output reference against the output of push-pull amplifiers 20, 21, 22 and 23 and the loop forces the output to follow the input.

The key fact that allows this invention to work is the fact that the instantaneous magnitude of the unrectified AC is always larger than the instantaneous reference amplitude. This is essentially true except possibly for small regions around the zero crossing of the reference. The resulting distortion is not a detrimental effect. It shows up on the output somewhat like Class B crossover distortion of Class AB amplifiers.

The push-pull amplifier outputs are required to handle the reactive synchro load and back EMF, i.e. amplifier must source and sink current when the output voltage is positive and it must sink and source current when the output is negative.

In retro-fit applications the low level non-critical bias voltages of e.g. plus and minus 40 volts is shown to be derived with halfwave rectifier diodes in conjunction with a zener diode and associated R.C. network.

Figure 2:
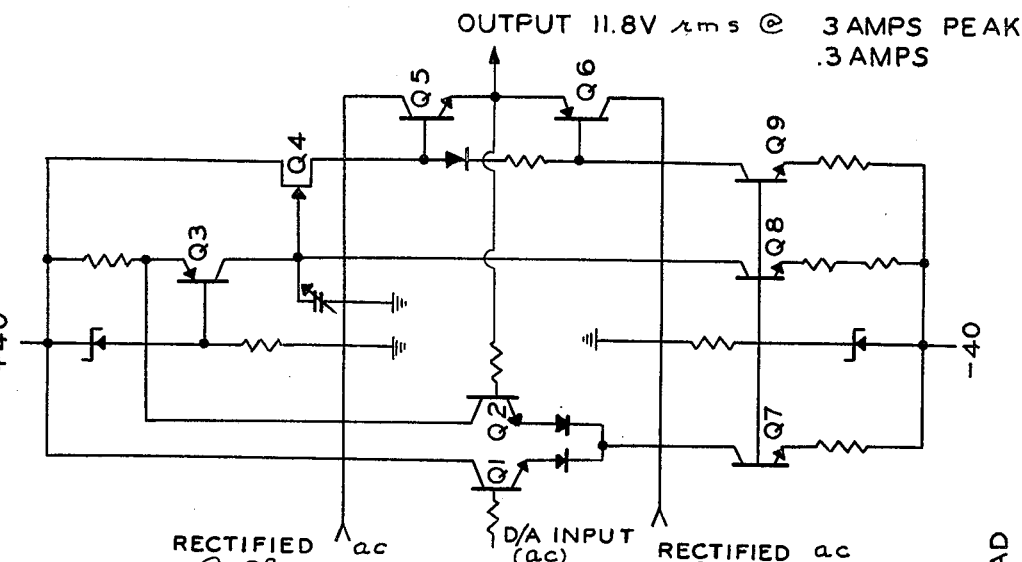
FIG. 2 is a more detailed schematic diagram of FIG. 1 showing the bipolar feedback power amplifier that derives its driver power from rectified AC.

In FIG. 2, the power stage of the invention derives all of its output power from the rectified AC line. Q1 and Q2 form the differential amplifier input stage. Q3 is connected in a cascode configuration and since it operates into the gate of a FET(Q4) it develops an open loop voltage gain of greater than 2000. Q4 acts as a source follower and drives the complementary NPN and PNP output transistors Q5 and Q6. In actual practice Q5 and Q6 can be considered Darlington pairs to provide enough current gain for high current peak loads. Except for Q5 and Q6 the plus or minus 40 volt supplies are derived by zener regulated half wave rectified AC. Q5 and Q6 are energized by pulsating DC, i.e. full wave rectified AC.

In operation when an error exists between input and output as determined by the differential input Q1 and Q2, an amplified error signal generated by Q3 is developed at the gate of FET Q4. This buffered error appears at the source of Q4 and linearly controls the base drive to the output transistors Q5 and Q6 and the feed back from the output of Q5 and Q6 to the base of Q2 keeps the input and output in equilibrium. In essence, the power amplifier output stages Q5 and Q6 can be considered to have good power supply rejection; i.e. it works with full wave rectified (pulsating) DC. Transistors Q7, Q8 and Q9 are connected in the common base mode and act as current source, to properly bias the amplifier.

Figure 3:
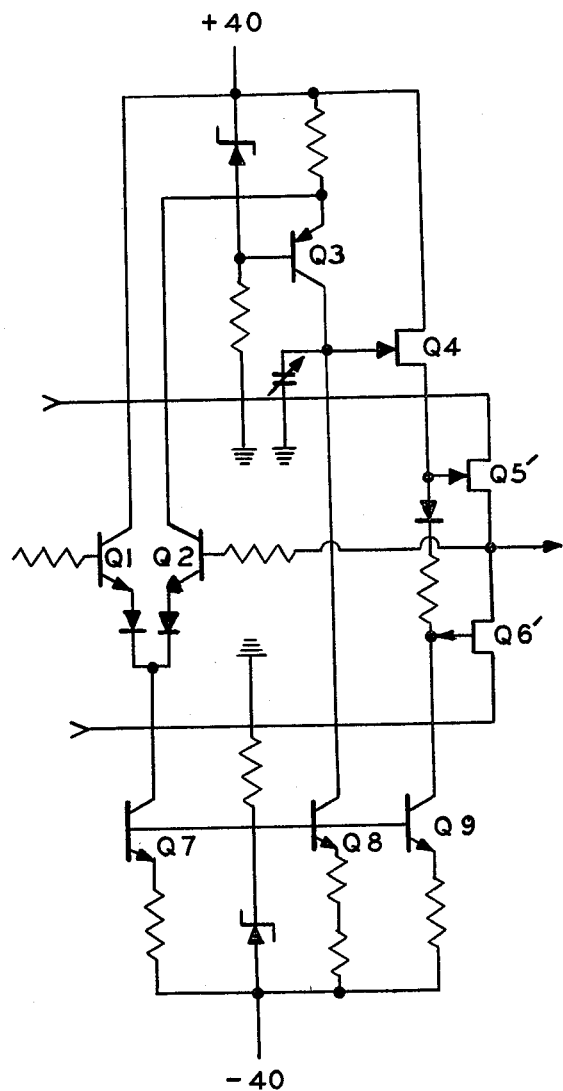
FIG. 3 shows a second embodiment of the invention in which output FET transistors are substituted for the N and P type transistors of FIG. 2.

In the embodiment of FIG. 3 complementary N and P type power FETs Q5' and Q6' would replace the NPN and PNP power transistors Q5 and Q6. Some significant advantages of this implementation are the capability of using unrectified AC directly, no second breakdown problems, high current gain in output device, lower bias current drain, etc.

While particular embodiments of the invention have been shown and described, modification may be made, and it is intended in the following claims to cover the embodiments which fall within the true spirit and scope of the invention.

What is claimed is:

1. A solid state synchro torque receiver driver comprising:
   a source of data bits,
   a latching circuit connected to said source of data bits,
   transformer means providing raw AC voltages at 0° and 180° phase differences, said transformer means including a plurality of rectifying diodes,
   converter means for converting said AC voltage into ratiometric signals, said converter means including a digital to analog converter having 0° and 180° phase output signals controlled by said latching circuit,
   output circuit means connected to said 0° and 180° phase AC voltage, said output circuit means including a push pull amplifier, and
   comparing means for comparing the outputs of said output circuit means and said converting means for deriving an error signal indicative of the amplitude difference between said output circuit means and the output of said converting means, said comparing means continuously nulling said error signal so that said output circuit means follows the output of said converting means, said comparing means including a feedback amplifier connected to the output of said digital to analog converter and to the output of said circuit output means whereby said feedback amplifier generates an error signal indicative of any change in the amplitude relationship between the output of said digital to analog converter and said output circuit means, and
   a synchro having first and second windings and having a rotor winding, said first stator winding being connected to ground, said rotor winding being excited by the same AC phase as said transformer, said push-pull amplifier being connected to said second stator winding so that the rotor phase shift of said synchro approximates the phase angle of said input signal and so that the amplifier output partially powers the synchro output, wherein
   said push-pull amplifier includes an NPN output transistor and a PNP output transistor, each said output transistor having a collector line connected to said plurality of rectifying diodes.

2. A solid state synchro torque receiver driver comprising:
   a transformer for providing raw AC voltages at 0° and 180° phases,
   a plurality of rectifying diodes connected to said transformer,
   a digital to analog converter connected to said 0° and 180° AC voltage,
   a push-pull amplifier connected to said 0° and 180° AC voltage,
   a feedback amplifier having one input connected to said digital to analog converter and another input connected to the output of said push-pull amplifier, said feedback amplifier generating an error signal indicative of any amplitude difference between the input from said digital to analog converter and the input from said push-pull amplifier, a latching circuit connected to said digital to analog converter for activating said digital to analog converter between up dates,
a source of data bits on a data bus line connected to said latching circuit whereby the most significant bit to said digital to analog converter controls the phase of the output signal from said digital converter and the least significant bits to said digital to analog converter controls the amplitude of the output signal from said analog converter, and
a synchro having first and second stator windings and having a rotor winding, said first stator winding being connected to ground, said rotor winding being excited by the same AC phase as said transformer, said push-pull amplifier being connected to said second stator winding so that the rotor phase shift of said synchro approximates the phase angle of said input signal and so that the amplifier output partially powers the synchro output, wherein
said push-pull amplifier includes an NPN output transistor and a PNP output transistor, each said output transistor having a collector line connected to said plurality of rectifying diodes.

3. A solid state synchro torque receiver driver comprising:
a source including a plurality of rectifying diodes for providing unrectified AC voltages at 0° and 180° phases,
a digital to analog converter connected to said 0° and 180° voltage source,
a push-pull output amplifier,
a differential amplifier having one output connected to said digital to analog converter and another input connected to the output of said push-pull amplifier, said differential amplifier generating an error signal indicative of any phase difference between the input from said digital to analog converter and the input from said push-pull amplifier,
a cascode connected transistor connected to said differential amplfiier for amplifying said error signal,
a field effect transistor having its drain electrode connected to said push-pull amplifier so that any error signal generated in said differential amplifier is nulled at the output of said push-pull amplifier and said output phase of said push-pull amplifier follows the input phase to said differential amplifier,
a latching circuit connected to said digital to analog converter for activating said digital to analog converter between up dates,
a source of data bits on a data line connected to said latching circuit whereby the phase and the amplitude of the output signal of said digital to analog converter is controlled, and
a synchro having first and second stator windings and having a rotor winding, said first stator winding being connected to ground, said rotor winding being excited by the same AC phase as said transformer, said push-pull amplifier being connected to said second stator winding so that the rotor phase shift to said synchro approximates the phase angle of said input signal and so that the amplifier output partially powers the synchro output, wherein
said push-pull amplifier includes an NPN output transistor and a PNP output transistor, each said output transistor having a collector line connected to said plurality of rectifying diodes.

* * * * *